United States Patent
Bai

(10) Patent No.: US 10,433,256 B2
(45) Date of Patent: Oct. 1, 2019

(54) APPLICATION CONTROL METHOD AND APPLICATION CONTROL DEVICE

(71) Applicant: GUANGDONG OPPO MOBILE TELECOMMUNICATIONS CORP., LTD., Dongguan, Guangdong (CN)

(72) Inventor: Jian Bai, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 15/961,246

(22) Filed: Apr. 24, 2018

(65) Prior Publication Data

US 2018/0368073 A1 Dec. 20, 2018

(30) Foreign Application Priority Data

Jun. 14, 2017 (CN) .......................... 2017 1 0449941

(51) Int. Cl.
*H04W 52/02* (2009.01)
*G06F 1/3206* (2019.01)
(Continued)

(52) U.S. Cl.
CPC ...... *H04W 52/0264* (2013.01); *G06F 1/3206* (2013.01); *G06F 1/3246* (2013.01);
(Continued)

(58) Field of Classification Search
CPC .... G06F 19/00; G06F 11/3644; G06F 1/3265; G06F 2217/68; G06F 9/3802; G06F 9/3836; G06F 9/445; G06F 11/0757; G06F 11/0793; G06F 11/3055; G06F 11/3058; G06F 11/3062; G06F 1/3212; G06F 2209/5022; G06F 9/4418; G06F 9/451;
(Continued)

(56) References Cited

U.S. PATENT DOCUMENTS

| 8,635,630 | B2 | 1/2014 | Iyer |
| 9,760,399 | B1 * | 9/2017 | Fraser ..................... G06F 9/485 |

(Continued)

FOREIGN PATENT DOCUMENTS

| CN | 102495761 A | 6/2012 |
| CN | 102981905 A | 3/2013 |

(Continued)

OTHER PUBLICATIONS

International Search Report in international application No. PCT/CN2018/086683, dated Aug. 3, 2018.
(Continued)

*Primary Examiner* — Daniel Lai
(74) *Attorney, Agent, or Firm* — Ladas & Parry LLP

(57) ABSTRACT

An application control method includes acquiring M running applications on a mobile terminal, wherein M is a positive integer; acquiring user habit data related to closing at least one application within the M running applications; and closing the at least one application within the M running applications according to the user habit data. With embodiments of the present disclosure, an intelligent closing of the applications can be achieved, and power consumption of a mobile terminal can be reduced.

8 Claims, 7 Drawing Sheets

(51) Int. Cl.
*G06F 1/3246* (2019.01)
*H04W 4/02* (2018.01)
*G06F 1/3212* (2019.01)

(52) U.S. Cl.
CPC ......... *H04W 4/02* (2013.01); *H04W 52/0258* (2013.01); *G06F 1/3212* (2013.01); *H04W 52/0254* (2013.01); *Y02D 10/174* (2018.01); *Y02D 70/00* (2018.01)

(58) Field of Classification Search
CPC .. G06F 9/45516; G06F 1/3206; G06F 1/3246; H04W 52/0254; H04W 52/0264; H04W 88/02; H04W 52/0258; H04W 52/0209; H04W 52/0216; H04W 52/0225; H04W 52/029; H04W 52/243; H04W 52/245; H04W 4/02; Y02D 10/174; Y02D 70/00
See application file for complete search history.

(56) References Cited

U.S. PATENT DOCUMENTS

| | | | | |
|---|---|---|---|---|
| 2006/0271618 | A1* | 11/2006 | Kokubo | H04M 1/72522 709/202 |
| 2008/0200220 | A1 | 8/2008 | Jackson | |
| 2009/0307692 | A1* | 12/2009 | Do | G06F 9/485 718/100 |
| 2012/0102504 | A1 | 4/2012 | Iyer | |
| 2012/0239949 | A1 | 9/2012 | Kalyanasundaram | |
| 2014/0007122 | A1* | 1/2014 | Udeshi | G06F 9/4893 718/103 |
| 2014/0365790 | A1 | 12/2014 | Chen et al. | |
| 2015/0112899 | A1* | 4/2015 | Dagum | A61B 5/6898 706/12 |
| 2016/0073351 | A1 | 3/2016 | Cardozo et al. | |

FOREIGN PATENT DOCUMENTS

| | | |
|---|---|---|
| CN | 103092685 A | 5/2013 |
| CN | 104899153 A | 9/2015 |
| CN | 106126295 A | 11/2016 |
| CN | 106131337 A | 11/2016 |
| CN | 106528236 A | 3/2017 |
| CN | 106528387 A | 3/2017 |
| CN | 107222914 A | 9/2017 |
| WO | 2012060955 A3 | 7/2012 |

OTHER PUBLICATIONS

English Translation of the Written Opinion of the International Search Authority in international application No. PCT/CN2018/086683, dated Aug. 3, 2018.
European Search Report in European application No. 18171072.4, dated Nov. 6, 2018.

* cited by examiner

APPLICATION CONTROL METHOD AND APPLICATION CONTROL DEVICE

CROSS REFERENCE TO RELATED APPLICATIONS

This application is a non-provisional patent application, which claims priority to Chinese Application No. 201710449941.7, filed on Jun. 14, 2017. The entire disclosure of the above application is incorporated herein by reference.

1. FIELD

The present disclosure relates to the field of mobile terminal technology, and specifically to an application control method and an application control device.

2. DESCRIPTION OF THE RELATED ART

With prevalence of mobile terminals, the mobile terminals can support more and more applications and have more powerful functions. Development of mobile terminals exhibits diversification and personalization. The mobile terminals have become indispensable electronic products. An increasing number of studies have found that how software runs and how a user uses his/her mobile terminal are key factors that determine power consumption and efficiency of a system of the mobile terminal.

At present, power consumption of mobile terminals has always been an issue. Usually, a user may choose to close applications to reduce the power consumption of his/her mobile terminal. However, to do so, the user has to close the applications one by one, and this is quite complex and time-consuming in operation. Moreover, if the user forgets to close the applications, the power consumption of the mobile terminal will not be reduced.

BRIEF DESCRIPTION OF DRAWINGS

To make the technical solutions under the present disclosure or in the prior art clearer, the accompanying drawings for illustrating the embodiments of the present disclosure or the prior art are outlined below. Apparently, the accompanying drawings are for the exemplary purpose only, and person skilled in the art may derive other drawings from such accompanying drawings without creative efforts.

DETAILED DESCRIPTION OF EMBODIMENTS

Figure 1:
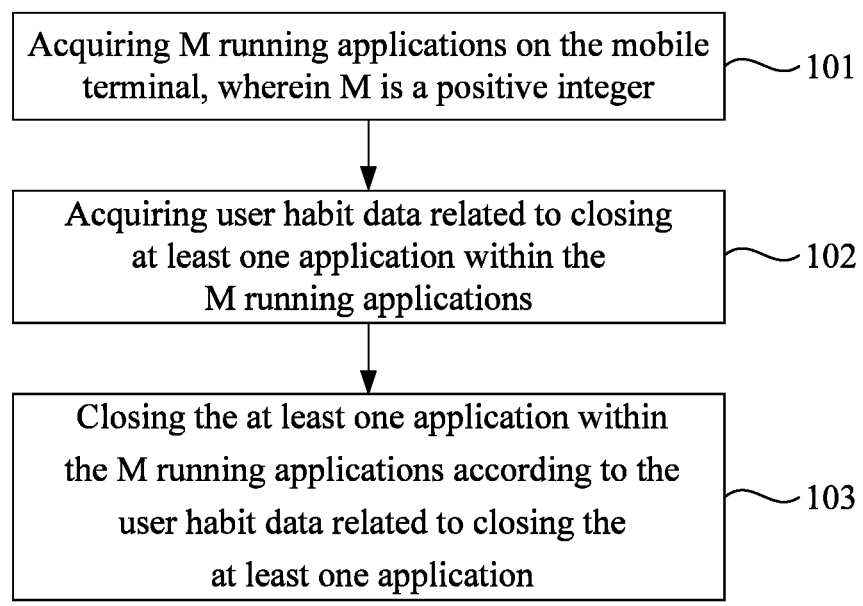
FIG. 1 is a schematic flowchart of an application control method according to an embodiment of the present disclosure.

The technical solutions of the present disclosure are clearly and fully described in the following with reference to the accompanying drawings. It is obvious that the embodiments to be described are only a part rather than all of the embodiments of the present disclosure. All other embodiments obtained by persons skilled in the art based on the embodiments of the present disclosure without creative efforts shall fall within the protection scope of the present disclosure.

In the specification, claims, and accompanying drawings of the present disclosure, the terms "first", "second", and the like are intended to distinguish between different objects but are not intended to describe a specific order. Besides, the terms "include", "have" and any variant thereof are intended to cover a non-exclusive inclusion. For example, a process, a method, a system, a product, or a device that includes a series of steps or units is not limited to the listed steps or units, but optionally further includes steps or units that are not listed, or optionally further includes other steps or units that are inherent to the process, method, system, product, or device.

The term "embodiment" mentioned herein means that a particular feature, structure, or characteristic described in connection with an embodiment can be included in at least one embodiment of the present disclosure. The appearance of this phrase in various places in the specification are not necessarily all referring to the same embodiment, nor are separate or alternative embodiments mutually exclusive of other embodiments. It will be understood by those skilled in the art, both explicitly and implicitly, that the embodiments described herein can be combined with other embodiments.

The mobile terminal involved in the embodiments of the present disclosure may include various handheld devices, in-vehicle devices, wearable devices, computing devices or other processing devices connected to a wireless modem with wireless communication functions, and various forms of user equipment (UE), mobile station (MS), terminal device, etc. For convenience of description, the above-mentioned devices are collectively referred to as mobile terminals. The following will describe the embodiments of the present disclosure in detail.

Optionally, in the mobile terminal according to the embodiment of the present disclosure, an artificial intelligence (AI) module may be installed. The AI module can be installed in the mobile terminal, independent of the processor. For example, the processor calls the AI module for artificial intelligence functionality. Of course, the AI module may be integrated with the processor, and in this case, the processor is equivalent to the AI module. The AI module may be a quantum chip or a high-density silicon integrated circuit. In the AI module, a machine training algorithm may be stored, which is used for training according to the user use habit (for example, closing records related to an application)

and deeply learning the user use habit. In this way, the mobile terminal is intelligently controlled by the AI module.

FIG. 1 is a schematic flowchart of an embodiment of an application control method according to an embodiment of the present disclosure. The application control method according to this embodiment includes the following blocks.

At block 101, M running applications (i.e. M-numbered applications that are running) are acquired, wherein M is a positive integer.

The applications may include, but be not limited to, game applications, video applications, music applications, payment applications, weather applications, traffic applications, etc. The mobile terminal may acquire M running applications. The M running applications may be foreground applications, or background applications of non-operating systems (for example, virtual private networks (VPNs) applications).

Optionally, before executing the block 101, the application control method may further include a block of:

detecting the current battery-level of the mobile terminal, executing the block 101 when the current battery-level is lower than a preset battery-level threshold, and not executing the block 101 when the current battery-level is higher than or equal to a preset battery-level threshold.

The preset battery-level threshold may be set by the user himself/herself or defaulted by the system. In this way, no closing operation will be performed on applications when the battery-level is high, and a closing operation will be performed on applications only when the battery-level is lower than a certain threshold.

At block 102, user habit data related to closing at least one application within the M running applications is acquired.

The mobile terminal according to the embodiment of the present disclosure may generate user habit data related to closing at least one application according to closing records of an application closed by the user. For example, if the user likes to close certain applications before he/she goes to bed, user habit data may be generated according to closing records of the applications closed by the user within a certain period of time. By taking the closing time as an example, if the closing records of an application A within five consecutive days show that the application A was closed at 23:20 in the first day, the application A was closed at 23:30 in the second day, the application A was closed at 23:25 in the third day, the application A was closed at 23:15 in the fourth day, and the application A was closed at 23:18 in the fifth day, the average time for closing the application A in the five days may be used as the closing time for the application A.

Optionally, in the block 102, acquiring user habit data related to closing at least one application may include the following steps:

acquiring P closing records for closing an application within a preset period of time, wherein P is an integer greater than 1;

classifying the P closing records according to an application ID to obtain Q application classes, wherein Q is an integer greater than 1; and analyzing the Q application classes to obtain a closing control parameter for each of the Q applications as the user habit data.

The preset period of time may be set by the user himself/herself or set as a system default. For example, the preset period of time may be the recent one month or the recent half a year. The mobile terminal may acquire P closing records for closing an application within a preset period of time, where P is an integer greater than 1. Of course, the P closing records are closing records for different applications. Therefore, the P closing records may be classified according to an application ID to obtain Q application classes, where Q is an integer greater than 1. The Q application classes are analyzed separately or wholly to obtain a closing control parameter for each application as the user habit data related to closing at least one application. The closing control parameter may include, but be not limited to, a closing time, a closing priority, a closing place, etc., wherein the closing time indicates when an application will be closed; the closing priority determines the order of closing applications, and the order of closing applications is determined from a higher priority to a lower priority; and the closing place indicates where an application will be closed, for example, some applications will be kept open in at work and closed at home.

In a specific implementation, the mobile terminal may analyze a certain application class to know in which period of time in a day the user likes to close an application. The mobile terminal may further determine the number of times of closing each application and thus determine a closing frequency for each application, and determine a closing priority for each application according to the closing frequency. Of course, a high closing frequency may be considered as a high closing priority.

Optionally, the closing control parameter includes a closing time and a closing priority. In the step of analyzing the Q application classes to obtain a closing control parameter for each of the Q applications as the user habit data may include the following steps:

all closing times corresponding to each of the Q application classes are analyzed to obtain a closing time corresponding to each of the Q application classes; and according to a closing frequency and power consumption for each of the Q application classes, a closing priority corresponding to each of the Q application classes is determined.

The mobile terminal may perform background monitoring on each of the Q applications corresponding to the Q application classes, to monitor the power consumption of each application. For example, the average power consumption of an application within a period of time can be used as the power consumption of this application. For the closing frequency of an application, the more times this application is closed, the closing frequency of this application is higher. If an application has not yet been closed, its closing frequency is 0 (some applications are expected to always in the operation state). The mobile terminal may determine a closing priority corresponding to each application class according to the closing frequency and the power consumption for each of the Q application classes. Specifically, a priority value may be set according to the closing frequency and the power consumption: priority value=a*closing frequency+b*power consumption, where "a" is a weight value corresponding to the closing frequency, "b" is a weight value corresponding to the power consumption, both "a" and "b" are greater than or equal to 0 and less than 1, and a+b=1. A greater priority value indicates a higher priority. A priority value corresponding to each of the Q applications may be calculated, and the priority corresponding to each application may be determined according to the priority value.

At block 103, a closing operation is performed on the M running applications according to the user habit data.

The mobile terminal may perform a closing operation on the M running applications according to the user habit data. For example, the mobile terminal may close the M running applications from a higher priority to a lower priority.

Optionally, the mobile terminal may successively close the M running applications according to the user habit data. For example, the mobile terminal may close an application with a high priority and then close an application with a low priority, with a certain interval between the two closing operations. Of course, part of applications may be closed first, and then other applications may be closed after a certain period of time.

Optionally, the user habit data is the closing time and the closing priority. In the execution of the block 103, during a closing operation performed on the M running applications according to the user habit data, a closing operation may be performed on the M running applications according to the closing time and the closing priority.

It can be known from the foregoing description that, by acquiring M running applications, where M is a positive integer; acquiring user habit data related to closing at least one application; and performing a closing operation on the M running applications according to the user habit data, applications which are running may be acquired and a closing operation may be performed on the applications according to the user habit data. In this way, an intelligent closing of the applications can be achieved and power consumption of a mobile terminal can be reduced.

Figure 2:
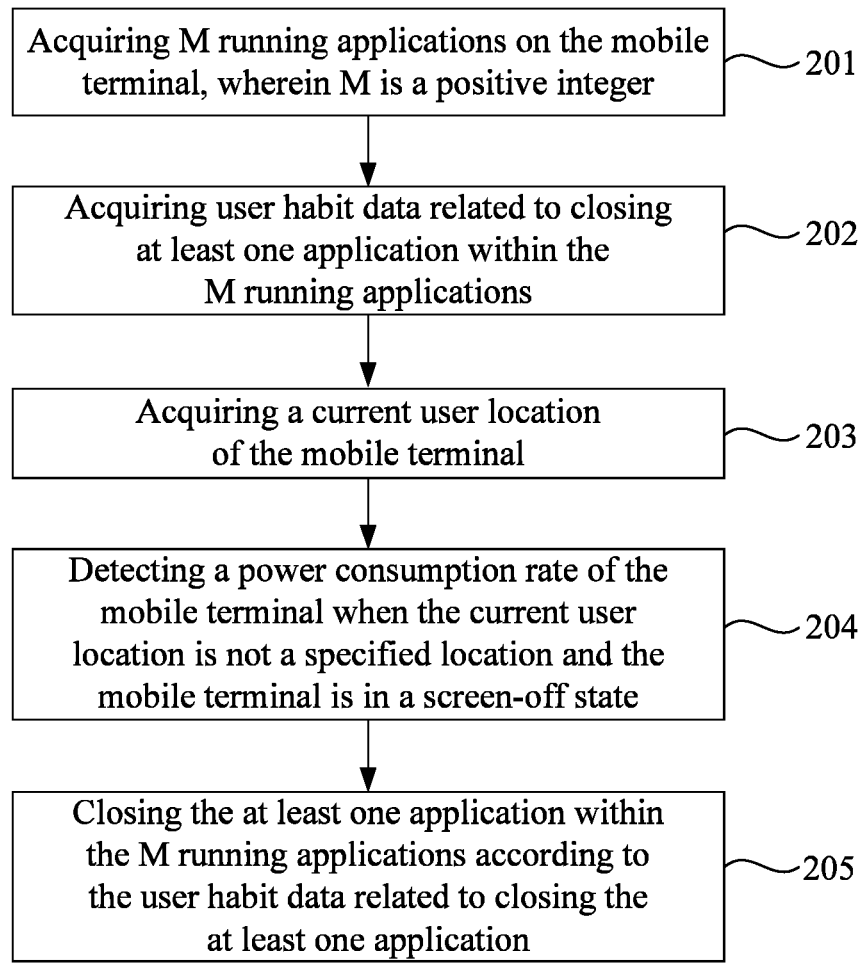
FIG. 2 is a schematic flowchart of another application control method according to the embodiment of the present disclosure.

FIG. 2 is a schematic flowchart of an embodiment of an application control method according to an embodiment of the present disclosure. The application control method according to this embodiment includes the following blocks.

At block 201, M running applications are acquired, where M is a positive integer.

At block 202, user habit data related to closing at least one application is acquired.

The blocks 201-202 may refer to the blocks 101-102 of the application control method described in FIG. 1, and will not be repeated here.

At block 203, a current user location is acquired.

The mobile terminal can acquire the current user location by the Global Positioning System (GPS) positioning technique or Wireless Fidelity (Wi-Fi) positioning technique.

At block 204, a power consumption rate of the mobile terminal is detected when the current user location is not a specified location and the mobile terminal is in a screen-off state.

The specified location may be set by the user himself/herself or defaulted by the system. Usually, in some places where the mobile terminal can be charged, you don't have to worry about the power consumption problem of the mobile terminal. Therefore, the power consumption rate of the mobile terminal may be detected when the current user location is not a specified location and the mobile terminal is in a screen-off state. The power consumption rate may be regarded as the rate at which the mobile terminal consumes power in every one second. Usually, if there are many applications running in the background in the mobile terminal, the power consumption rate will be high; and if there are few applications running in the background in the mobile terminal, the power consumption rate will be low.

At block 205, a closing operation is performed on the M running applications according to the user habit data when the power consumption rate is greater than a preset threshold.

The preset threshold may be set by the user himself/herself or defaulted by the system. The mobile terminal may perform a closing operation on the M running applications according to the user habit data when the power consumption rate is greater than the preset threshold.

It can be known from the foregoing description that, by acquiring M running applications, where M is a positive integer, acquiring user habit data related to closing at least one application; and performing a closing operation on the M running applications according to the user habit data, applications which are running may be acquired, a current user location may be acquired, the power consumption rate of the mobile terminal may be detected when the current user location is not a specified location and the mobile terminal is in a screen-off state, and a closing operation may be performed on the applications according to the user habit data when the power consumption rate is greater than a preset threshold. In this way, an intelligent closing of applications can be achieved when the user is not in a specified location and the power consumption rate is too high, and power consumption of a mobile terminal can be reduced. For example, when the user is on a business trip or on a journey, it is inconvenient to charge the mobile terminal. In this case, the power consumption of the mobile terminal may be reduced properly.

Figure 3:
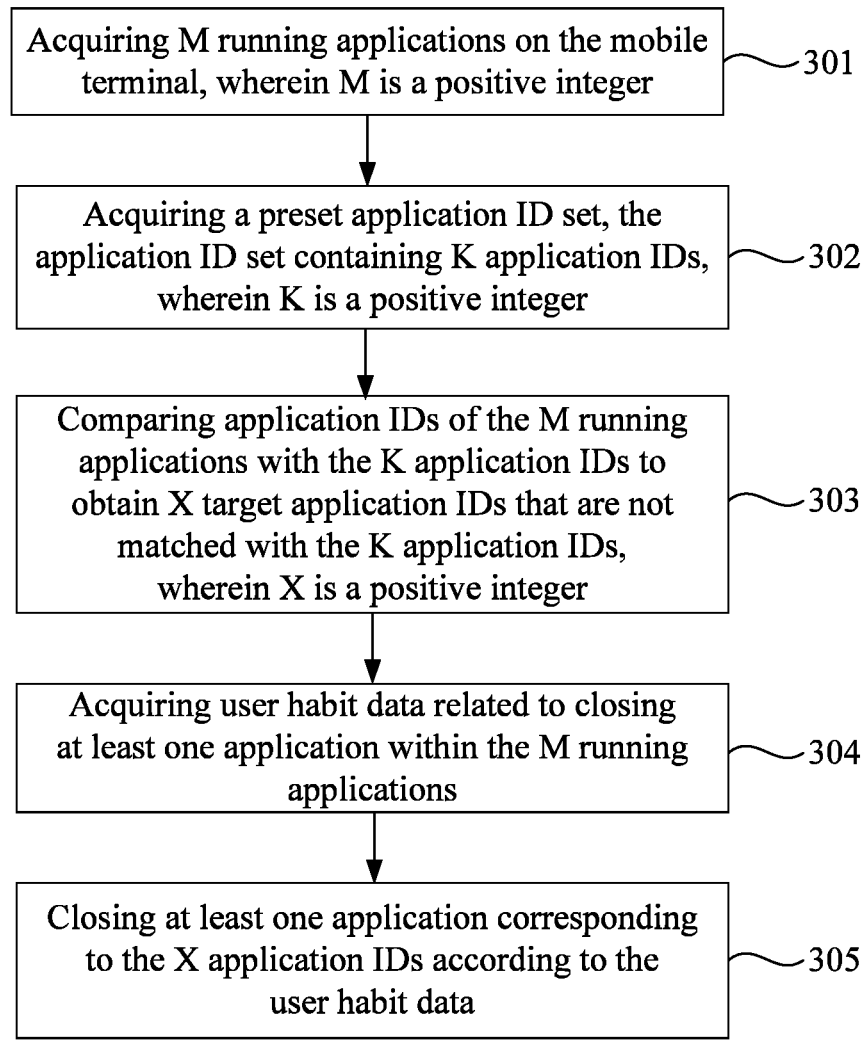
FIG. 3 is a schematic flowchart of yet another application control method according to the embodiment of the present disclosure.

FIG. 3 is a schematic flowchart of an embodiment of an application control method according to an embodiment of the present disclosure. The application control method according to this embodiment includes the following blocks.

At block 301, M running applications are acquired, where M is a positive integer.

The block 301 may refer to the block 101 of the application control method described in FIG. 1, and will not be repeated here.

At block 302, a preset application ID set is acquired, the application ID set containing K application IDs, where K is a positive integer.

The preset application ID set may be set by the user himself/herself or defaulted by the system. If the preset application ID set is set by the user himself/herself, applications not expected to be closed may be set in this set; and if the preset application ID set is defaulted by the system, applications that have not yet been closed may be set in this set. Usually, the user may prefer some applications and do not want such applications to be closed. For example, when playing a game, the game application may be kept running, without closing it, because attention should be paid to the update of games. The setup of the preset application ID set may be completed before the execution of this embodiment. The application ID set may contain K application IDs, where K is a positive integer.

At block 303, application IDs of the M running applications are compared with the K application IDs to obtain X target application IDs that are not matched with the K application IDs, where X is a positive integer.

The mobile terminal may compare application IDs of the M running applications with the K application IDs. If two applications have a same application ID, they are matched. In this way, X target application IDs can be obtained, i.e., X application IDs among the M application IDs. The X application IDs do not exist in the K application IDs.

At block 304, user habit data related to closing at least one application is acquired.

The block 304 may refer to the block 102 of the application control method described in FIG. 1, and will not be repeated here.

At block 305, a closing operation is performed on applications corresponding to the X application IDs according to the user habit data.

The block 305 may refer to the description of the application control method described in FIG. 1, and will not be repeated here.

It can be known from the foregoing description that, in the embodiment of the present disclosure, by acquiring M running applications, where M is a positive integer; acquiring a preset application ID set, the application ID set containing K application IDs, where K is a positive integer, and comparing application IDs of the M running applications with the K application IDs to obtain X target application IDs that are not matched with the K application IDs, where X is a positive integer, user habit data related to closing at least one application is acquired, a closing operation is performed on applications corresponding to the X target application IDs according to the user habit data, and before closing an application, the application IDs of applications which are running may be compared with the application IDs in the preset application ID set, and a closing operation is performed on applications which do not belong to the preset application ID set according to the user habit data. In this way, applications that the user does not want to close are kept open, and only applications that the user wants to close are closed. An intelligent closing of applications can be achieved, and power consumption of a mobile terminal can be reduced. For example, usually, if the user wants to pay attention to the update of games, he/she may keep those games running, without closing them.

Figure 4A:
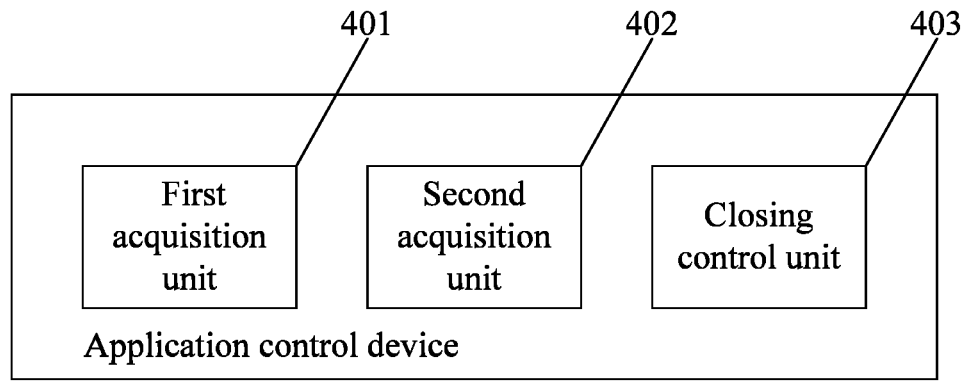
FIG. 4A is a structure diagram of an application control device according to the embodiment of the present disclosure.

FIG. 4A is a structure diagram of an application control device according to the embodiment of the present disclosure. The application control device is applied in a mobile terminal. The application control device includes a first acquisition unit 401, a second acquisition unit 402 and a closing control unit 403.

The first acquisition unit 401 is configured to acquire M running applications, where M is a positive integer;

the second acquisition unit 402 is configured to acquire user habit data related to closing at least one application; and The closing control unit 403 is configured to perform a closing operation on the M running applications according to the user habit data.

Figure 4B:
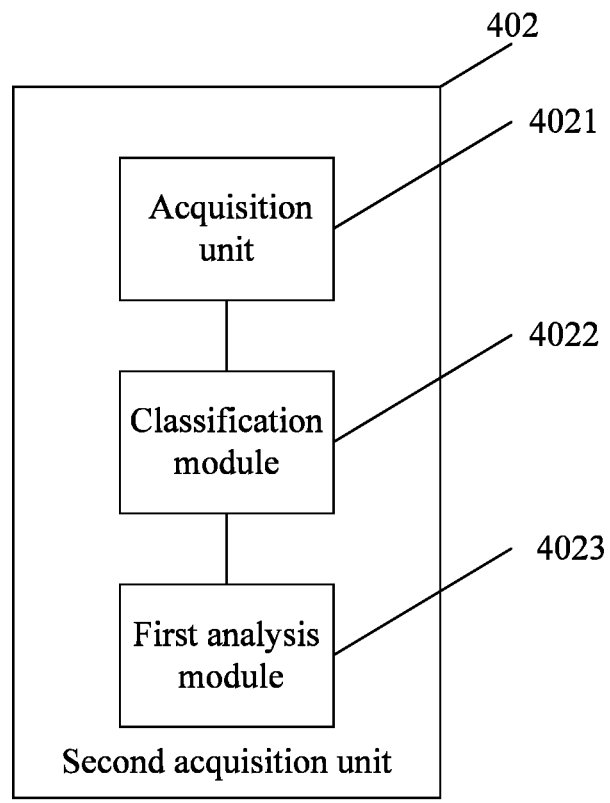
FIG. 4B is a structure diagram of a second acquisition unit of the application control device of FIG. 4A according to the embodiment of the present disclosure.

Optionally, FIG. 4B shows a specific and detailed structure of a second acquisition unit 402 of the application control device of FIG. 4A. The second acquisition unit 402 may include an acquisition module 4021, a classification module 4022 and a first analysis module 4023.

The acquisition module 4021 is configured to acquire P closing records for closing an application within a preset time period, where P is an integer greater than 1.

The classification module 4022 is configured to classify the P closing records according to an application ID to obtain Q application classes, where Q is an integer greater than 1.

The first analysis module 4023 is configured to analyze the Q application classes to obtain a closing control parameter for each of the Q applications as the user habit data.

Figure 4C:
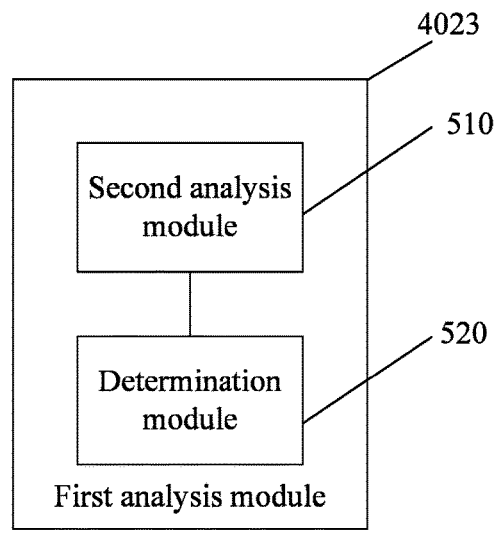
FIG. 4C is a structure diagram of a first analysis module of the second acquisition unit of FIG. 4B according to the embodiment of the present disclosure.

Optionally, the closing control parameter includes a closing time and a closing priority. FIG. 4C shows a specific and detailed structure of a first analysis module 4023 of the second acquisition unit 402 of FIG. 4B. The first analysis module 4023 may include a second analysis module 510 and a determination module 520.

The second analysis module 510 is configured to analyze all closing times corresponding to each of the Q application classes to obtain a closing time corresponding to each of the Q application classes.

The determination module 520 is configured to determine, according to a closing frequency and power consumption for each of the Q application classes, a closing priority corresponding to each of the Q application classes.

Figure 4D:
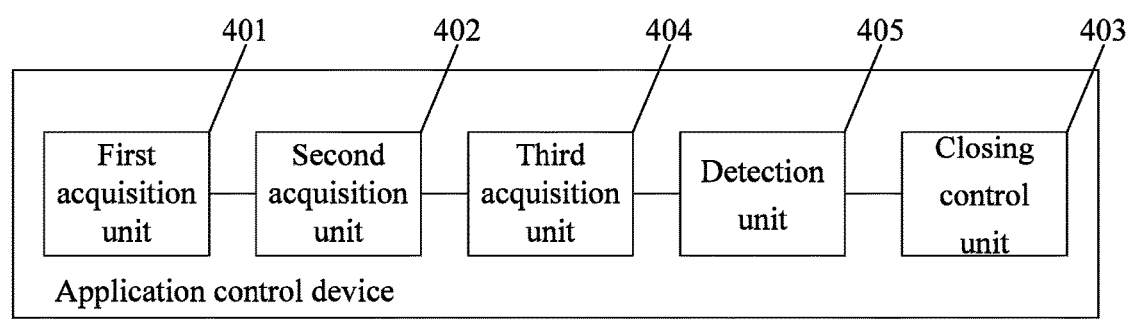
FIG. 4D is a structure diagram of an application control device according to another embodiment of the present disclosure.

Optionally, FIG. 4D shows another variation of the application control device of FIG. 4A. Compared with that shown in FIG. 4A, the application control device may further include a third acquisition unit 404 and a detection unit 405.

The third acquisition unit 404 is configured to acquire a current user location.

The detection unit 405 is configured to detect a power consumption rate of a mobile terminal when the current user location is not a specified location and the mobile terminal is in a screen-off state, and execute, by the closing control unit 403, the step of performing a closing operation on the M running applications according to the user habit data when the result of detection by the detection unit 405 shows that the power consumption rate is greater than a preset threshold.

Figure 4E:
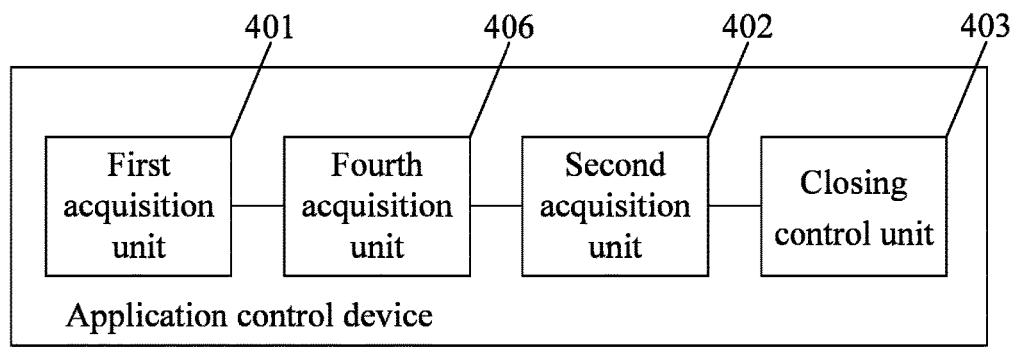
FIG. 4E is a structure diagram of an application control device according to still another embodiment of the present disclosure.

Optionally, FIG. 4E shows yet another variation of the application control device of FIG. 4A. Compared with that shown in FIG. 4A, the application control device may further include a fourth acquisition unit 406.

The fourth acquisition unit 406 is configured to acquire a preset application ID set, the application ID set containing K application IDs, where K is a positive integer.

The closing control unit 403 is specifically configured to compare application IDs of the M running applications with the K application IDs to obtain X target application IDs that are not matched with the K application IDs, where X is a positive integer; and perform a closing operation on applications corresponding to the X application IDs according to the user habit data.

It may be understood that functions of program modules of the application control device in this embodiment may be specifically implemented according to the method described in the above method embodiment. The specific implementation process may refer to the related description of the above method embodiment and will not be repeated here.

Figure 5:
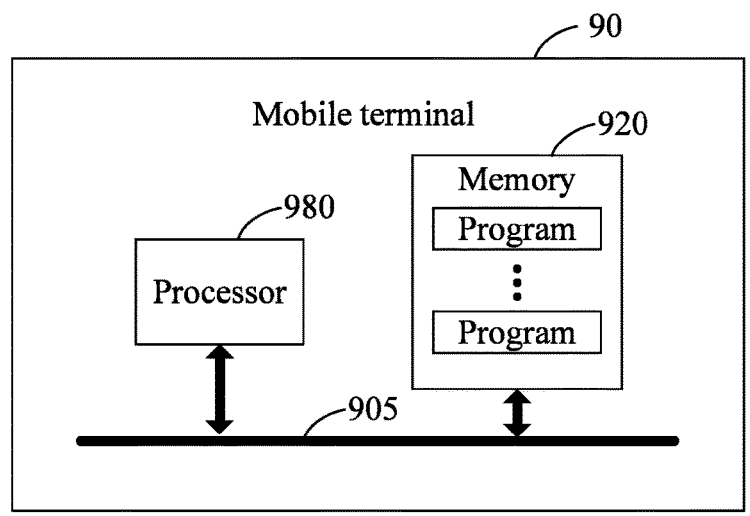
FIG. 5 is a structure diagram of a mobile terminal according to the embodiment of the present disclosure.

FIG. 5 is a structure diagram of a mobile terminal according to the embodiment of the present disclosure. The mobile terminal includes a processor 980, a memory 920 connected to the processor 980 via a bus 905, and one or more programs stored in the memory and configured to be executed by the processor. The programs include instructions for executing following steps of:

acquiring M running applications, where M is a positive integer;

acquiring user habit data related to closing at least one application; and performing a closing operation on the M running applications according to the user habit data.

In one possible example, in the aspect of acquiring the user habit data related to closing at least one application, the instructions in the programs are specifically configured to execute following steps of:

acquiring P closing records for closing an application within a preset time period, where P is an integer greater than 1;

classifying the P closing records according to an application ID to obtain Q application classes, where Q is an integer greater than 1; and analyzing the Q application classes to obtain a closing control parameter for each of the Q applications as the user habit data.

In one possible example, the closing control parameter includes a closing time and a closing priority. In the aspect of analyzing the Q application classes to obtain a closing control parameter for each of the Q applications as the user habit data, the instructions in the programs are specifically configured to execute following steps of:

analyzing all closing times corresponding to each of the Q application classes to obtain a closing time corresponding to each of the Q application classes; and determining, according to a closing frequency and power consumption for each of the Q application classes, a closing priority corresponding to each of the Q application classes.

In one possible example, the instructions in the programs are further specifically configured to execute following steps of:

acquiring a current user location; and detecting a power consumption rate of a mobile terminal when the current user location is not a specified location and the mobile terminal is in a screen-off state, and executing the step of performing a closing operation on the M running applications according to the user habit data when the power consumption rate is greater than a preset threshold.

In one possible example, the instructions in the programs are further specifically configured to execute following steps of:

acquiring a preset application ID set, the application ID set containing K application IDs, where K is a positive integer; and the performing a closing operation on the M running applications according to the user habit data includes:

comparing application IDs of the M running applications with the K application IDs to obtain X target application IDs that are not matched with the K application IDs, where X is a positive integer, and performing a closing operation on applications corresponding to the X application IDs according to the user habit data.

Figure 6:
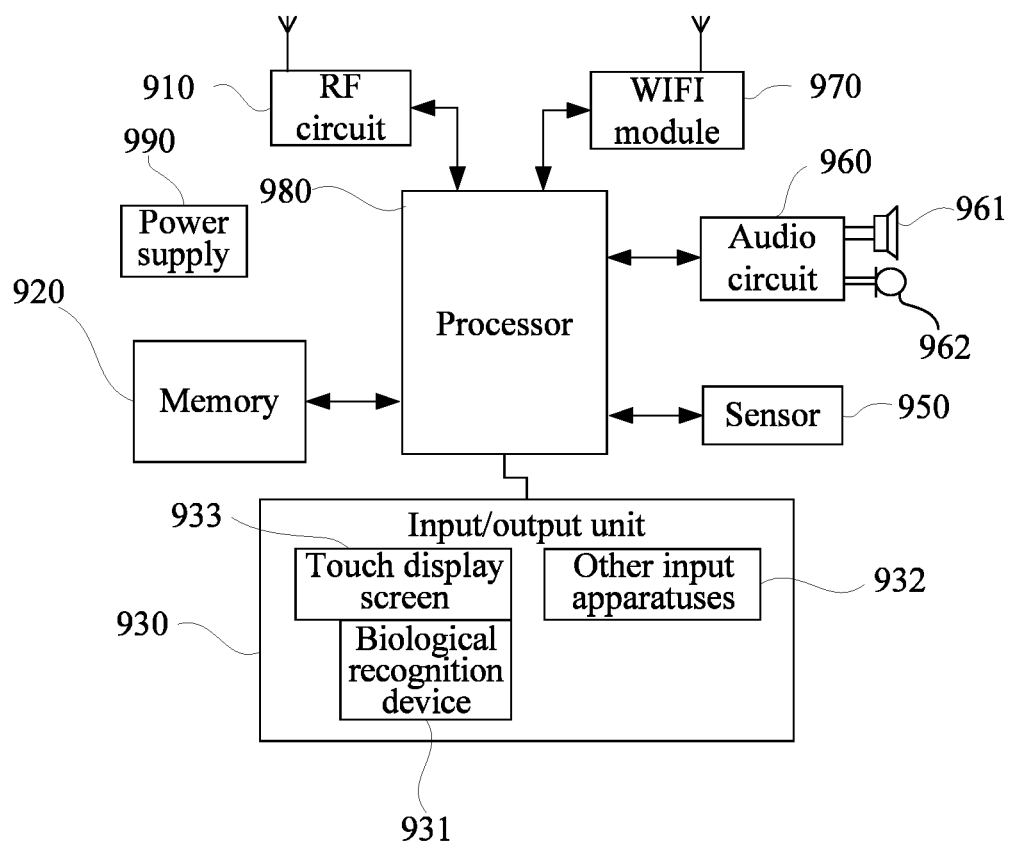
FIG. 6 is another structure diagram of the mobile terminal according to the embodiment of the present disclosure.

The mobile terminal of the embodiment of the present disclosure further provides another structure, as shown in FIG. 6. For ease of description, only the part related to the embodiment of the present disclosure is shown, and the specific technical details are not disclosed. For the specific technical details, please refer to the method description in the embodiment of the present disclosure. The mobile terminal may be any terminal apparatus, for example, a mobile phone, a Personal Digital Assistant (PDA), a Point of Sales (POS), an on-board computer, etc. The following description is given by regarding the mobile terminal as a mobile phone.

FIG. 6 is another block diagram of the structure of the mobile terminal according to the embodiment of FIG. 5 of the present disclosure. Referring to FIG. 6, the mobile terminal includes a Radio Frequency (RF) circuit 910, the memory 920, an input unit 930, a sensor 950, an audio circuit 960, a WIFI module 970, the processor 980, a power supply 990, etc. It may be understood by those skilled in the art that the structure of the mobile terminal shown in FIG. 6 does not form any limitation to the mobile terminal. The mobile terminal may include more or less components than the shown components, or combinations of some components, or different component arrangements.

The constituent components of the mobile terminal will be specifically described with reference to FIG. 6.

The input unit 930 may be configured to receive the input number or character information, and generate a key signal input related to the user settings and function control of the mobile terminal. Specifically, the input unit 930 may include a touch display screen 933, a biological recognition device 931 and other input apparatuses 932. The biological recognition device 931 may be a face recognition device, an iris recognition device or a fingerprint recognition device. The input unit 930 may further include other input apparatuses 932. Specifically, the other input apparatuses 932 may include, but be not limited to, one or more of physical buttons, function keys (for example, the volume control button and the switch button), a trackball, a mouse, a lever, etc. The processor 980 is configured to acquire M running applications, where M is a positive integer; acquire user habit data related to closing at least one application; and perform a closing operation on the M running applications according to the user habit data.

The processor 980 is the control center of the mobile phone. It connects all parts of the entire mobile phone via various interfaces and circuits, and executes various functions of the mobile phone and processes data by running or executing software programs and/or modules stored in the memory 920 and by calling data stored in the memory 920, to comprehensively monitor the mobile phone. Optionally, the processor 980 may include one or more processing units. Optionally, the processor 980 may be the integration of a processor and a modem processor, wherein the processor is mainly responsible for processing the operating system, the user interface, the application programs, etc., and the modem processor is mainly responsible for processing wireless communication. It may be understood that the modem processor may not be integrated into the processor 980.

In addition, the memory 920 may include a high speed random access memory, and may further include a nonvolatile memory, for example, at least one disk storage device, a flash memory device, or other volatile solid-state storage devices.

The RF circuit 910 may be configured to receive and transmit information. Usually, the RF circuit 910 includes, but is not limited to, an antenna, at least one amplifier, a transceiver, a coupler, a Low Noise Amplifier (LNA), a duplexer, etc. In addition, the RF circuit 910 may also communicate with the network and other apparatuses via wireless communication. The wireless communication may use any communication standard or protocol including, but not limited to, Global System of Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS), and the like.

The mobile phone may further include at least one sensor 950, for example, a light sensor, a motion sensor and other sensors. Specifically, the light sensor may include an ambient light sensor and a proximity sensor, wherein the ambient light sensor may adjust the brightness of the touch display screen according to the intensity of the ambient light and the proximity sensor may close the touch display screen and/or the backlight when the mobile phone is moved to an ear. As one of motion sensors, an acceleration sensor may detect the acceleration in all directions (generally triaxial). When the mobile phone is not moving, the acceleration sensor may detect the size and direction of its gravity. It may be configured to recognize the posture of the mobile phone (for example, switch between portrait and landscape orientations, related games, magnetometer posture calibration), functions related to vibration recognition (for example, pedometer, knocking), or more. The mobile phone may be further equipped with a gyroscope, a barometer, a hygrometer, a thermometer, an IR sensor and other sensors, which will not be repeated here.

The audio circuit 960, the loudspeaker 961 and the microphone 962 can provide an audio interface between the user and the mobile phone. The audio circuit 960 may convert the received audio data into electric signals and then transmit the electric signals to the loudspeaker 961 which converts the electric signals into sound signals and then plays the sound signals. On the other hand, the microphone 962 converts the collected sound signals into electric signals which are received and then converted into audio data by the audio circuit 960, and the audio data is processed by the processor 980 and then transmitted to another mobile phone via the RF circuit 910, or the audio data is played to the memory 920 to be further processed.

WIFI is a short-distance wireless data transmission technique. The mobile phone can assist the user in receiving and sending E-mails, browsing webpages and accessing streaming media by a WIFI module 970. It provides the user with wireless access to the broadband internet. Although the WIFI module 970 is shown in FIG. 6, it may be understood that the WIFI module 970 is not necessary to the mobile phone. The WIFI module 970 may be omitted, if desired, without changing the scope of the essence of the present disclosure.

The mobile phone further includes a power supply 990 (for example, batteries) for powering various components. Optionally, the power supply may be logically connected to the processor 980 via a power management system, to achieve the functions such as charging, discharging and power consumption management via the power management system.

Although not shown, the mobile phone may further include a camera, a BLUETOOTH module or more, which will not be repeated here.

In the embodiments shown in FIG. 1 to FIG. 3, the flows of the steps and methods may be implemented on the basis of the structure of the mobile phone.

In the embodiments shown in FIG. 4A to FIG. 4E and FIG. 5, the functions of the units may be implemented on the basis of the structure of the mobile phone.

An embodiment of the present disclosure further provides a computer storage medium, wherein the computer storage medium stores a computer program for electronic data exchange, and the computer program causes a computer to execute a part of the steps or all steps of any one of the application control methods described in the above method embodiments.

An embodiment of the present disclosure further provides a computer program product, the computer program product includes a non-transitory computer-readable storage medium storing a computer program, wherein the computer program is operable to cause a computer to execute a part of the steps or all steps of any one of the application control methods described in the above method embodiments.

It should be noted that for each of the foregoing method embodiments, for the sake of simple description, they are all expressed as a series of action combinations, but those skilled in the art should understand that the present disclosure is not limited by the described action sequence. Because according to the present disclosure, certain steps may be performed in other sequences or simultaneously. Secondly, those skilled in the art should also understand that the embodiments described in the specification are all optional embodiments, and the involved actions and modules may not necessarily required by the present disclosure.

In the above embodiments, the description of each embodiment has its own emphasis. For the part that is not described in detail in one embodiment, reference may be made to the relevant description of other embodiments.

In several embodiments provided in the present application, it should be understood that the disclosed system, device, and method may be implemented in other ways. For example, the described device embodiments are merely exemplary. For example, the unit division is merely logical function division and can be other division in actual implementation. For example, multiple units or components can be combined or integrated into another system, or some features can be ignored or not performed. Furthermore, the shown or discussed coupling or direct coupling or communication connection may be accomplished through some interfaces, and indirect coupling or communication connection between devices or units may be electrical, or in other forms.

Units described as separate components may be or may not be physically separated. Components shown as units may be or may not be physical units; that is, the components may be integrated or distributed to a plurality of network units. Some or all of the modules may be selected to achieve the objective of the solution of the embodiment according to actual demands.

In addition, various functional units according to each embodiment of the present disclosure may be integrated in one processing module or may exist as various separate physical units, or two or more units may also be integrated in one unit. The integrated units may be implemented in the form of hardware; it may also be implemented in the form of a software program module.

When the integrated units are implemented in the form of a software program module and sold or used as an independent product, they may be stored in a computer readable storage medium. Based on such understanding, the nature of the technical solutions of the present disclosure, or a part that makes contribution to the prior art, or part of the technical solutions, may be embodied in the form of a software product. The computer software product is stored in a storage medium, and includes several instructions to enable a computer equipment (such as a personal computer, a server, or a network equipment) to perform all or part of the processes of the methods according to each embodiment of the present disclosure. The storage medium includes various media capable of storing program codes, such as a USB flash disk, a read-only memory (ROM), a random access memory (RAM), a removable hard disk, a magnetic disk or a compact disk.

It should be noted that a person skilled in the art may understand that all or some of the processes in the methods of the embodiments described above can be realized by using computer programs to instruct corresponding hardware. The programs may be stored in a computer readable storage medium. The storage medium may be flash disk, read-only memory (ROM), random access memory (RAM), magnetic disk, or compact disc, or the like.

The embodiments of the present disclosure have been described in detail. The principles and implementations of the present disclosure have been explained here by specific examples. The description of the embodiments is provided just for helping the understanding of the method of the present disclosure and its key concept. Meanwhile, it may be understood by a person of ordinary skill in the art that various changes may be done to the specific implementations and application scope under the teaching of the present disclosure. In conclusion, the content of the description shall not be considered as any limitation to the present disclosure.

What is claimed is:

1. An application control method of a mobile terminal, comprising steps of:
  acquiring M running applications on the mobile terminal, wherein M is a positive integer;
  acquiring user habit data related to closing at least one application within the M running applications; and closing the at least one application within the M running applications according to the user habit data related to closing the at least one application;

wherein the acquiring user habit data related to closing at least one application comprises:

acquiring P closing records for closing the at least one application within the M running applications within a preset period of time, wherein P is an integer greater than 1;

classifying the P closing records according to an application ID to obtain Q application classes, wherein Q is an integer greater than 1; and acquiring a closing control parameter for each of the Q application classes as the user habit data;

wherein the closing control parameter comprises a closing time and a closing priority for each of the Q application classes;

wherein acquiring a closing control parameter for each of the Q application classes as the user habit data comprises:

analyzing all closing times corresponding to each of the Q application classes to obtain a closing time corresponding to each of the Q application classes; and determining, according to a closing frequency and power consumption for each of the Q application classes, a closing priority corresponding to each of the Q application classes.

2. The method according to claim 1, further comprising steps of:

acquiring a current user location of the mobile terminal; and detecting a power consumption rate of the mobile terminal when the current user location is not a specified location and the mobile terminal is in a screen-off state, and executing the step of closing the at least one application within the M running applications according to the user habit data when the power consumption rate is greater than a preset threshold.

3. The method according to claim 1, further comprising a step of:

acquiring a preset application ID set, the application ID set containing K application IDs, wherein K is a positive integer; and the step of closing the at least one application within the M running applications according to the user habit data related to closing the at least one application comprises:

comparing application IDs of the M running applications with the K application IDs to obtain X target application IDs that are not matched with the K application IDs, wherein X is a positive integer; and closing at least one application corresponding to the X application IDs according to the user habit data.

4. A mobile terminal comprising a processor; a memory; and one or more programs stored in the memory and configured to be executed by the processor, the programs including instructions for executing the method according to claim 1.

5. An application control device of a mobile terminal, comprising:

one or more processors; and a memory for storing instructions executable by the one or more processors, wherein the one or more processors are arranged to:

acquire M running applications, wherein M is a positive integer;

acquire user habit data related to closing at least one application within the M running applications; and close the at least one application within the M running applications according to the user habit data related to closing the at least one application;

wherein the one or more processors are further arranged to:

acquire P closing records for closing the at least one application within the M running applications within a preset period of time, wherein P is an Integer greater than 1;

classify the P closing records according to an application ID to obtain Q application classes, wherein Q Is an Integer greater than 1; and analyze the Q application classes to obtain a closing control parameter for each of the Q application classes as the user habit data;

wherein the closing control parameter comprises a closing time and a closing priority for each of the Q application classes; and the one or more processors are further arranged to:

analyze all closing times corresponding to each of the Q application classes to obtain a closing time corresponding to each of the Q application classes; and determine, according to a closing frequency and power consumption for each of the Q application classes, a closing priority corresponding to each of the Q application classes.

6. The device according to claim 5, wherein the one or more processors are further arranged to:

acquire a current user location of the mobile terminal; and detect a power consumption rate of the mobile terminal when the current user location is not a specified location and the mobile terminal is in a screen-off state, and execute the step of closing the at least one application within the M running applications according to the user habit data when the result of detection shows that the power consumption rate is greater than a preset threshold.

7. The device according to claim 6, wherein the one or more processors are further arranged to:

acquire a preset application ID set, the application ID set containing K application IDs, wherein K is a positive integer; and compare application IDs of the M running applications with the K application IDs to obtain X target application IDs that are not matched with the K application IDs, wherein X is a positive integer; and close at least one application corresponding to the X application IDs according to the user habit data.

8. The device according to claim 5, wherein the one or more processors are further arranged to:

acquire a preset application ID set, the application ID set containing K application IDs, wherein K is a positive integer; and compare application IDs of the M running applications with the K application IDs to obtain X target application IDs that are not matched with the K application IDs, wherein X is a positive integer; and close at least one application corresponding to the X application IDs according to the user habit data.

* * * * *